United States Patent
Han et al.

(10) Patent No.: US 7,706,752 B2
(45) Date of Patent: Apr. 27, 2010

(54) WIRELESS COMMUNICATION TERMINAL AND METHOD FOR CONTROLLING POWER AND USING CHANNEL BY ADJUSTING CHANNEL BANDWIDTH OF WIRELESS COMMUNICATION TERMINAL

(75) Inventors: Sang-min Han, Hwaseong-si (KR); Young-hwan Kim, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 722 days.

(21) Appl. No.: 11/603,108

(22) Filed: Nov. 22, 2006

(65) Prior Publication Data

US 2007/0265011 A1 Nov. 15, 2007

(30) Foreign Application Priority Data

May 11, 2006 (KR) .................. 10-2006-0042474

(51) Int. Cl.
*H04B 1/00* (2006.01)
*H04B 7/00* (2006.01)
*H04Q 7/20* (2006.01)

(52) U.S. Cl. ............... 455/63.3; 455/41.2; 455/440; 455/522

(58) Field of Classification Search ........... 455/569.1, 455/569.2, 426.1, 41.2, 522, 69, 127.1, 63.3, 455/440
See application file for complete search history.

(56) References Cited

U.S. PATENT DOCUMENTS

| | | | | | |
|---|---|---|---|---|---|
| 5,729,607 | A | * | 3/1998 | DeFries et al. | 380/263 |
| 6,560,463 | B1 | * | 5/2003 | Santhoff | 455/522 |
| 6,614,806 | B1 | * | 9/2003 | Nanni | 370/468 |

* cited by examiner

*Primary Examiner*—Tilahun Gesesse
(74) *Attorney, Agent, or Firm*—Sughrue Mion, PLLC

(57) ABSTRACT

A wireless communication terminal and a method for controlling power and using a channel by adjusting a channel bandwidth of the wireless communication terminal. The wireless communication terminal generates a plurality of channels by dividing at least part of a frequency band for ultra-wideband communications to a plurality of frequency bands, receives a chaotic signal having a plurality of frequency components in the channels, and adjusts a frequency bandwidth which forms the channel when a certain condition is satisfied. Accordingly, since the chaotic carrier is transmitted and received in the narrow frequency band by adjusting the frequency bandwidth, the power consumption can be reduced drastically and the high-quality communications are feasible between the portable terminal and the wireless headset in the optimized channel environment. Furthermore, a greater number of portable terminals and wireless headsets can execute the radio communications in a certain wireless communication range.

27 Claims, 7 Drawing Sheets

WIRELESS COMMUNICATION TERMINAL AND METHOD FOR CONTROLLING POWER AND USING CHANNEL BY ADJUSTING CHANNEL BANDWIDTH OF WIRELESS COMMUNICATION TERMINAL

CROSS-REFERENCE TO RELATED APPLICATIONS

This application claims priority from Korean Patent Application No. 10-2006-0042474 filed on May 11, 2006, in the Korean Intellectual Property Office, the disclosure of which is incorporated herein by reference.

BACKGROUND OF THE INVENTION

1. Field of the Invention

Methods and apparatuses consistent with the present invention relate to a wireless communication terminal and a method for controlling power and using a channel by adjusting a channel bandwidth of the wireless communication terminal. More particularly, the present invention relates to a wireless communication terminal which can change a channel bandwidth for the transmission of radio signals according to environmental conditions, reduce power consumption, guarantee good communication performance by preventing interference between wireless communication terminals, and allow communications of more wireless communication terminals by assigning part of the channel bandwidth to newly-entering wireless communication terminals when every channel is in use, and a method of power control and channel use incorporating such adjustment of channel bandwidth.

2. Description of the Related Art

Bluetooth, which is recently attracting attention in the wireless communication, is a short-distance radio communication standard. Bluetooth enables bidirectional communications among digital devices in real time by wirelessly connecting a mobile phone, a computer, and a personal digital assistant (PDA) within 10~100 m with a phone, a computer, and home appliances in home or office. Frequency band of Bluetooth ranges 2.402~2.480 GHz which is the Industrial, Scientific, and Medical (ISM) bands of 2.4 GHz.

If two wireless terminals communicating with each other, through Bluetooth are referred to as a transmitter terminal and a receiver terminal, respectively, the pair of the transmitter terminal and the receiver terminal can be a mobile terminal and a wireless headset, a computer and a wireless headset, a computer and a peripheral, and the like.

To prevent interference between the receiver terminals at a short distance, the Bluetooth utilizes a frequency hopping which is a kind of spread spectrum method. The frequency hopping, which changes the frequencies at random, defines 79 frequency bands by dividing the bandwidth by 1 MHz in the Bluetooth band of 2.402~2.480 GHz and converts frequency bands to transmit signals. The frequency band conversion is carried out 1600 times per one second.

Mostly, one receiver terminal is connected to one transmitter terminal for radio communications. At the initial communication, the transmitter terminal matches the channel between the transmitter terminal and the receiver terminal by sending radio signals to the receiver terminal in a preset channel. Herein, the channel is a kind of codes formed through the frequency hopping, and the channel can be set based on in which order 79 frequency bands, which are divided for the frequency hopping, are converted. For instance, if the divided frequency bands are referred to as $1^{st}$ through $79^{th}$ bands, the channel 1 can sequentially hop the $1^{st}$ through $79^{th}$ bands and the channel 2 can hop the $5^{th}$ band, the $29^{th}$ band, the $17^{th}$ band, the $3^{rd}$ band, . . . in that order.

Ultra-wideband wireless communication is under development using the ultra-wideband frequency band of 3.1~5.1 GHz. The ultra-wideband wireless communication transmits and receives communication signals primarily using on-off keying (OOK) modulation which transmits and receives digital signals as ON and OFF. To prevent the interference with other transmitter terminals, the OOK modulation generates a channel by dividing the frequency band of 3.1~5.1 GHz to a plurality of bands. The transmitter terminal and the receiver terminal communicate with each other using the selected channel of the divided bands.

In the ultra-wideband chaotic communication system using the OOK modulation, since the frequency power density is defined according to the standard specification, the wireless power intensity is determined by the bandwidth of the used channel. Accordingly, the power consumption of the battery is determined. The wider channel frequency bandwidth, the more power consumption of the battery. Although the channel bandwidth is determined to optimize the channel communication state, the communication state may be good without using the whole channel bands depending on the channel environment. However, since the channel bandwidth is not technically adjustable up to now, the channel bandwidth is always the same. Hence, disadvantageously, the power is wasted in the good channel environment.

The power consumption can be reduced by narrowing the channel bandwidth in a good channel environment.

When the pairs of the transmitter terminal and the receiver terminal equal the number of the channels which reside within a certain wireless communication range, that is, when all channels are occupied, a new transmitter terminal 1 and a new receiver terminal 1 may enter the wireless communication range. In this case, communication interference occurs between the new transmitter terminal 1 and the new receiver terminal 1, and between the transmitter terminals using the same channel, and the radio communications fail to both sides.

This disadvantage results from the fixed channel bandwidth and the fixed number of channels in the OOK modulation. Therefore, to overcome it, a new channel is generated by adjusting the channel bandwidth.

SUMMARY OF THE INVENTION

The present invention provides a wireless communication terminal for drastically reducing the power consumption by adjusting a frequency bandwidth, in which radio signals are transmitted and received, according to environment during the wireless communications, and guaranteeing communication performance by preventing interference between wireless communication terminals, and a method for controlling the power and using the channel by adjusting the channel bandwidth of the wireless communication terminal.

The present invention also provides a wireless communication terminal which enables a greater number of wireless communication terminals to communicate by allocating part of the channel bandwidth to another wireless communication terminal when every channel is in use.

According to an aspect of the present invention, a wireless communication terminal generates a plurality of channels by dividing at least part of a frequency band for ultra-wideband communications to a plurality of frequency bands, receives a chaotic signal having a plurality of frequency components in the channels, and adjusts a frequency bandwidth which forms the channel when a certain condition is satisfied.

The certain condition may be a power level of the chaotic signal.

The wireless communication terminal may include a power sensor which detects a power level of the chaotic signal.

The wireless communication terminal may include a filter which changes a frequency bandwidth by adjusting a filtered band of the chaotic signal.

The filter may be a band pass filter.

The wireless communication terminal may include a controller which generates a control signal to vary a filtered band of the filter according to the power level of the chaotic signal.

Each of the channels may include a plurality of sub-channels that are a plurality of frequency sub-bands.

The controller may determine whether to use the sub-channels of a selected channel according to the power level of the received chaotic signal.

The controller may increase the number of the sub-channels in the selected channel when the power level of the received chaotic signal is low.

The controller may generate a control signal to increase the number of the sub-channels in use when the chaotic signal is not received within a preset time.

The controller may linearly increase or decrease the frequency bandwidth according to the power level of the signal received from a receiver terminal.

The controller may increase the frequency bandwidth when the power level of the received chaotic signal is low.

A guard band of a certain width may be formed between neighboring channels, the guard band in which the chaotic signal is not transmitted and received.

When all the channels within a certain wireless communication range are in use, an available sub-channel of the channels may be temporarily allocated to a wireless communication terminal which enters the certain wireless communication range.

The chaotic signal may have a plurality of frequency components in the ultra-wideband frequency band.

The wireless communication terminal may be one of the following: a portable terminal, a computer, an MPEG-1 Audio Layer 3 (MP3) player, a radio frequency (RF) transceiver, a television (TV), a personal music player (PMP), a personal data assistant (PDA), a wireless headset, a wireless mouse, and a computer peripheral.

The chaotic signal may be received from one of the following: a portable terminal, a computer, an MP3 player, an RF transceiver, a TV, an audio, a PMP, a PDA, a wireless headset, a wireless mouse, a computer peripheral, and a speaker.

According to an aspect of the present invention, a channel bandwidth adjusting method of a wireless communication terminal includes generating a plurality of channels by dividing at least part of a frequency band for ultra-wideband communications to a plurality of frequency bands, and transmitting a chaotic signal having a plurality of frequency components in one of the channels; determining communication state of the channel by detecting energy of the chaotic signal; determining whether to change a frequency bandwidth in the channel according to the channel communication state; and transmitting and receiving the chaotic signal in a certain frequency band of the channel.

BRIEF DESCRIPTION OF THE DRAWING FIGURES

These and/or other aspects of the present invention will become more apparent and more readily appreciated from the following description of exemplary embodiments thereof, with reference to the accompanying drawings, in which.

DETAILED DESCRIPTION OF THE EXEMPLARY EMBODIMENTS OF THE INVENTION

Figure 1:
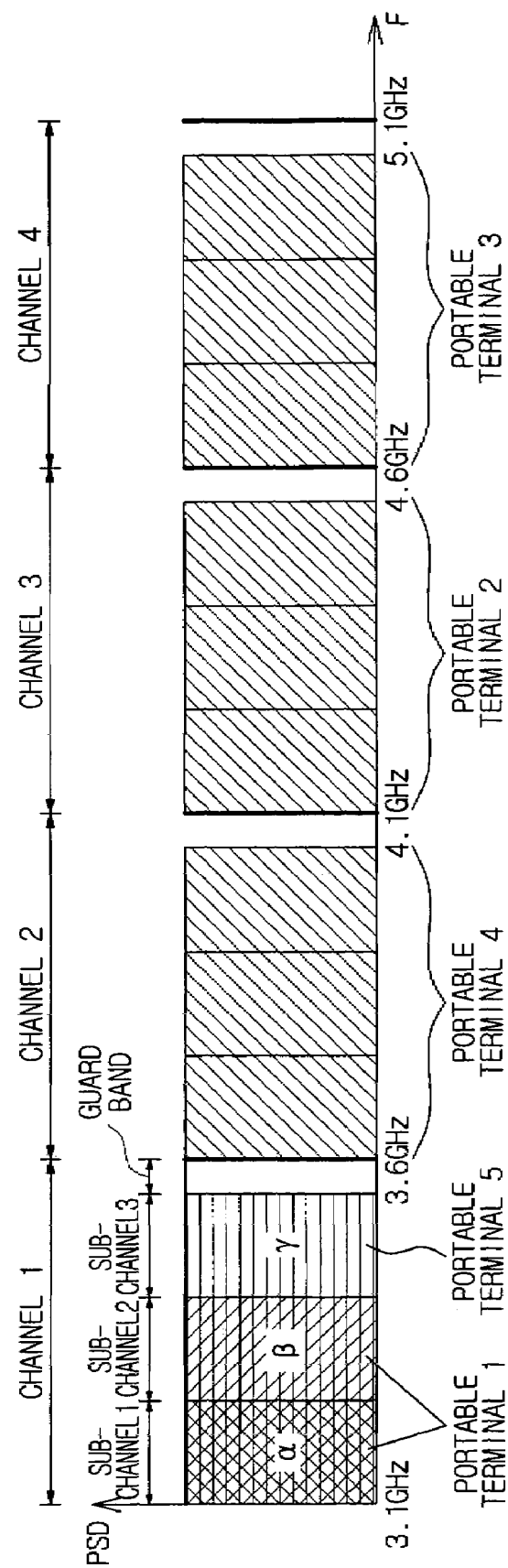
FIG. 1 is a diagram showing a channel structure in an ultra-wideband frequency band according to an exemplary embodiment of the present invention.

Certain exemplary embodiments of the present invention will now be described in greater detail with reference to the accompanying drawings.

In the following description, the same drawing reference numerals are used to refer to the same elements, even in different drawings. The matters defined in the following description, such as detailed construction and element descriptions, are provided as examples to assist in a comprehensive understanding of the invention. Also, well-known functions or constructions are not described in detail, since they would obscure the invention in unnecessary detail.

A wireless communication terminal of the present invention can wirelessly transmit and receive data using a chaotic signal and adjust a channel bandwidth according to channel state. Herein, the chaotic signal is a kind of carrier having plural frequency components in a certain frequency band, and generated directly in a frequency band to transmit data signals.

A transmitter terminal of the wireless communication terminals can be a portable terminal, a computer, an MP3 player, an RF transceiver, a TV, a PMP, a PDA, a wireless headset, a wireless mouse, a computer peripheral, and so forth. A receiver terminal can employ a portable terminal, a computer, an MP3 player, an RF transceiver, a TV, a PMP, a PDA, a wireless headset, a wireless mouse, a computer peripheral, a speaker, and so forth.

In an exemplary embodiment of the present invention, the transmitter terminal is a portable terminal and the receiver terminal is a wireless headset by way of example. It should be understood that the wireless communication system of the present invention is applicable to all other devices capable of carrying out the short-distance wireless communications.

FIG. 1 is a diagram of a channel structure in an ultra-wideband frequency band according to an exemplary embodiment of the present invention. As shown in FIG. 1, in an ultra-wideband wireless communication system, a chaotic signal is generated to have a plurality of frequency components throughout a 3.1~5.1 GHz band.

The 3.1~5.1 GHz band is divided to a plurality of channels. For instance, when the frequency band of the chaotic signal is divided by 500 MHz, four frequency sub-bands are produced and set to four channels. In specific, 3.1~3.6 GHz is set to the channel 1, 3.6~4.1 GHz is set to the channel 2, 4.1~4.6 GHz is set to the channel 3, and 4.6~5.1 GHz is set to the channel 4. As a result, the frequency band of the chaotic signal has four channels and one of the channels is used for communications between a portable terminal and a wireless headset.

Each channel is divided into a plurality of sub-channels. Although each channel includes three sub-channels in FIG. 1, each channel may include two or more sub-channels. Likewise, the frequency bandwidth of the channel may vary by a designer and according to the communication efficiency.

Meanwhile, a guard band is provided to prevent signal interference between neighboring channels. When the channel is divided by 500 MHz as illustrated above, the guard band can range 10~100 MHz between the channels. The bandwidth of the guard band can be designed in an optimum size enough to prevent the signal interference.

Figure 2:
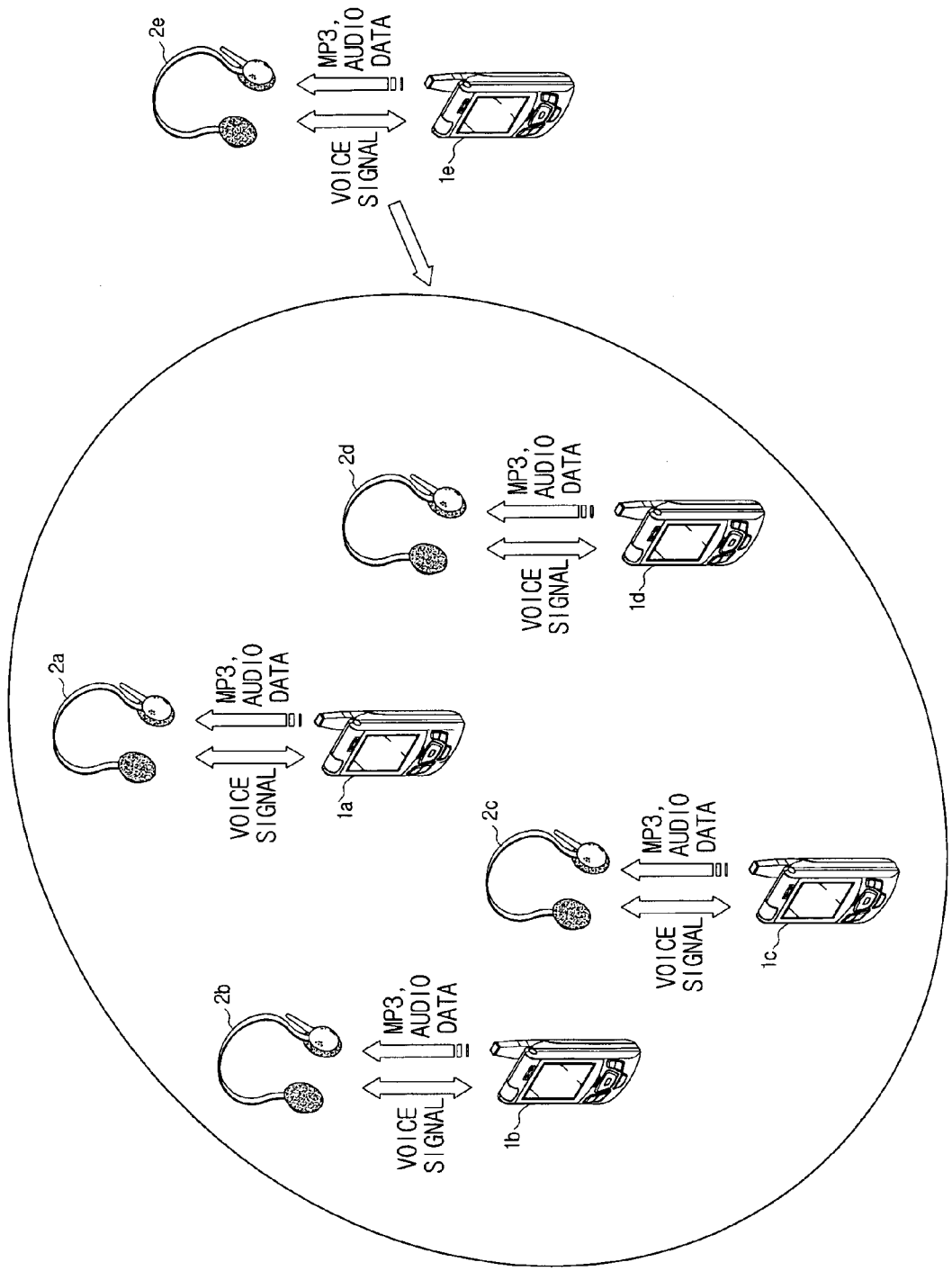
FIG. 2 is a diagram showing channel relationship of a plurality of pairs of a portable terminal and a wireless headset, to which the channel structure of FIG. 1 is applied.

FIG. 2 is a diagram showing channel relationship of a plurality of pairs of a portable terminal and a wireless headset, to which the channel structure of FIG. 1 is applied.

Channel 1, channel 3, channel 4, and channel 2 are respectively assigned to the plurality of the pairs of a first portable terminal 1a through a fourth portable terminal 1d and a first wireless headset 2a through a fourth wireless headset 2d within a certain wireless communication range to execute radio communications. The respective portable terminals and the respective wireless headsets are capable of adjusting the channel bandwidth depending on channel environment. Thus, all or part of the channel bandwidth can be used. For instance, in case of the channel 1, the first portable terminal 1a and the first wireless headset 2a utilize solely the sub-channel 1, without using the sub-channels 2 and 3.

In this state, when a new fifth portable terminal 1e and a new fifth wireless headset 2e enter the wireless communication range, the sub-channel 2 or 3 of the channel 1 can be allocated to them.

In other words, in the radio communications between the portable terminal and the wireless headset, the channel bandwidth is adjustable depending on the channel communication state and the empty bandwidth of the channel can be used as an additional channel.

To this end, the first portable terminal 1a through the fourth portable terminal 1d and the first wireless headset 2a through the fourth wireless headset 2d include a wireless communication system which is described below.

Figure 3:
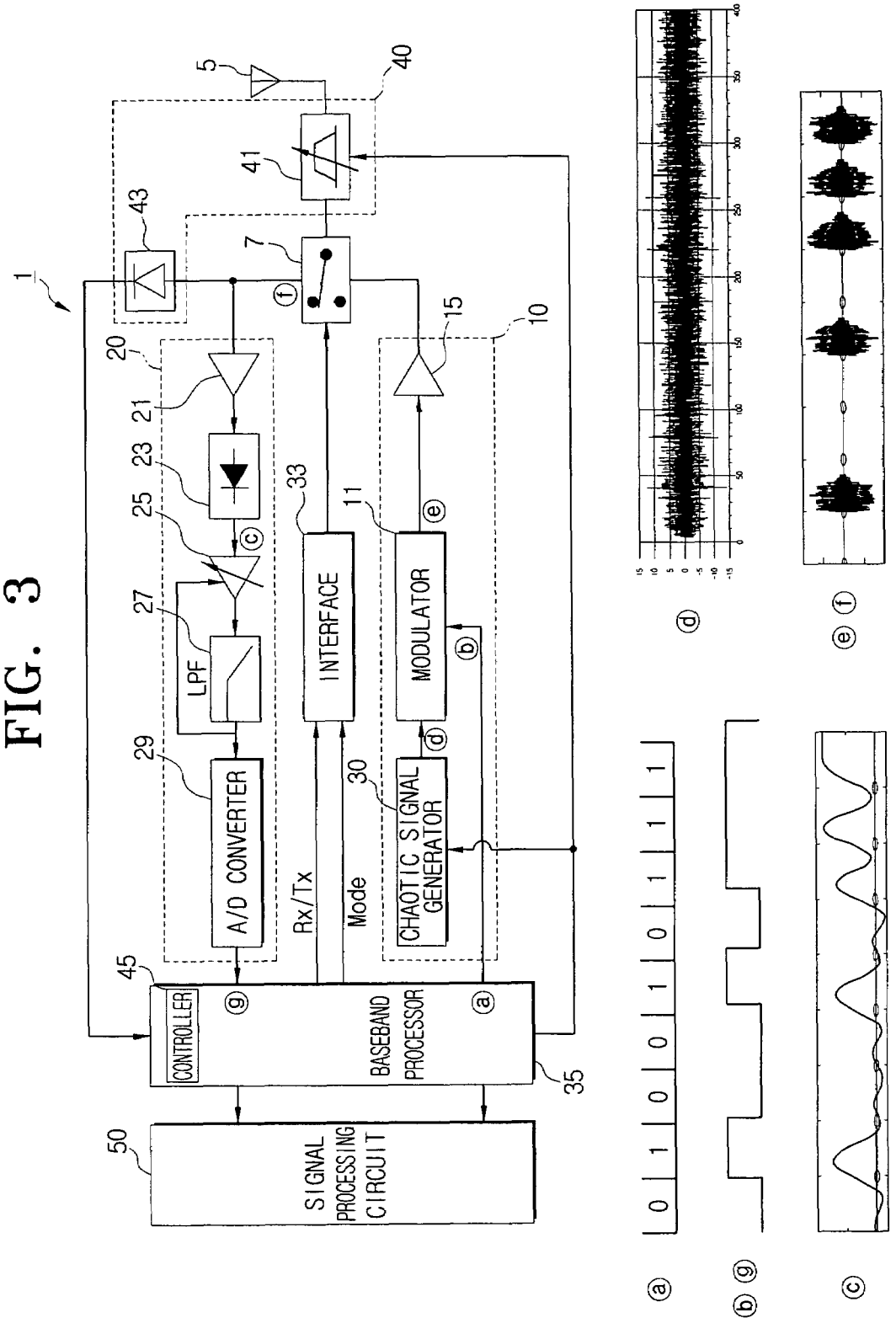
FIG. 3 is a block diagram of a wireless communication system using a chaotic signal, which is provided in a portable terminal according to an exemplary embodiment of the present invention.

FIG. 3 is a block diagram of a wireless communication system using a chaotic signal, which is provided in a portable terminal 1 according to an exemplary embodiment of the present invention.

The wireless communication system of the portable terminal 1 includes a channel changing circuit 40 which changes a channel, a transmission circuit 10 which transmits a chaotic carrier acquired by modulating a data signal to the chaotic signal, and a reception circuit 20 which receives the chaotic carrier and estimates the data signal.

The channel changing circuit 40 is connected to an antenna 5, the transmission circuit 10, and the reception circuit 20, to change the channel bandwidth, that is, to change the sub-channel for communications between the portable terminal 1 and the wireless headset 2. The channel changing circuit 40 includes a filter 41 for changing the channel bandwidth and a power sensor 43 for detecting a power level of the chaotic signal received from the wireless headset 2. The channel is changed by the filter 41 which receives a detection result from the power sensor 43 under control of the controller 45.

The filter 41 filters the chaotic signal, which is transmitted or received via the antenna, by a preset frequency bandwidth so that only the chaotic signal of the frequency band corresponding to a pre-selected sub-channel of a pre-selected channel can be transmitted and received. For instance, if the sub-channel 1 of the channel 1 is selected, the filter 41 operates to filter the frequency band indicated by a in FIG. 1. If the sub-channel 1 and the sub-channel 2 of the channel 1 are selected, the filter 41 operates to filter the frequency bands indicated by α and β in FIG. 1. If all of the sub-channels 1, 2, and 3 of the channel 1 are selected, the filter 41 operates to filter all frequency bands indicated by α, β and γ in FIG. 1.

When increasing the number of the operating sub-channels, the sub-channel 1, the sub-channel 2, and the sub-channel 3 are sequentially selected. However, the sub-channel 2 may be selected initially, the sub-channel 1 may be selected in next order, and the sub-channel 3 may be selected lastly. Note that the selection order of the operating sub-channels can be changed by the designer.

The filter 41 can be implemented using a variable band pass filter (BPF). The variable BPF 41 is capable of not only filtering and passing an intended frequency band but also changing the filtered frequency bandwidth. Accordingly, the sub-channel can be changed to transmit and receive the chaotic signal in the sub-channel of the intended channel.

Figure 4:
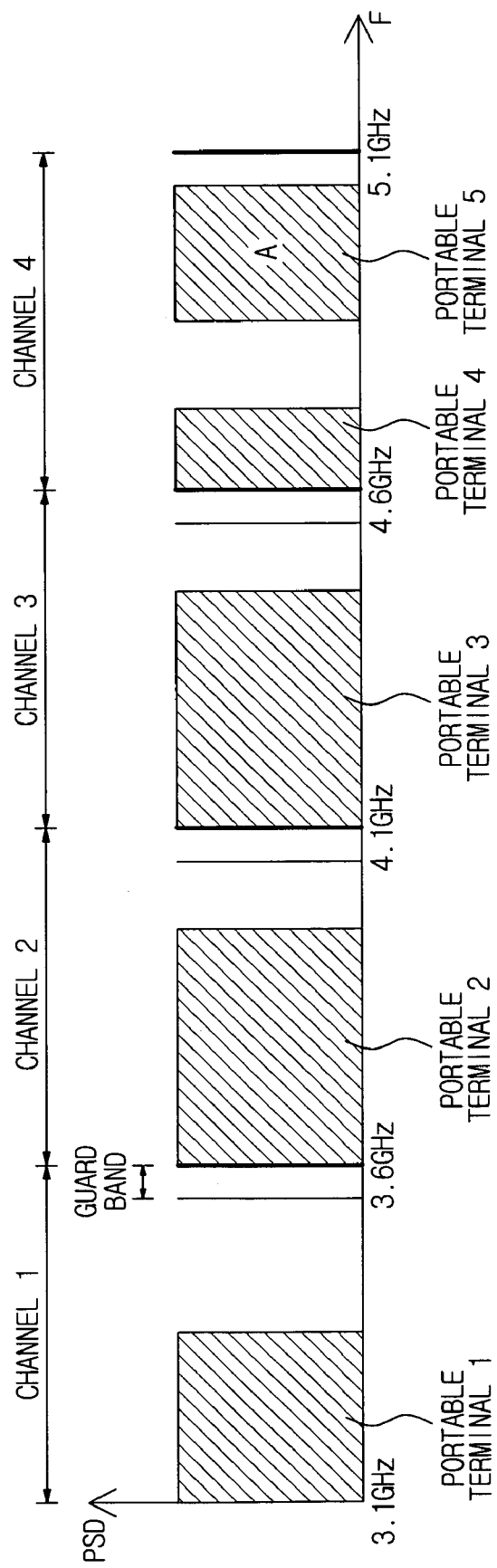
FIG. 4 is a diagram showing channel adjustment in an ultra-wideband frequency band according to another exemplary embodiment of the present invention.

Although each channel is divided into the plurality of the sub-channels in the exemplary embodiment of the present invention, the plurality of the channels may be generated without dividing each channel into the sub-channels as shown in FIG. 4.

In this case, the filter 41 can linearly change the frequency bandwidth of the channel. Hence, the bandwidth of the respective channels in FIG. 4 varies based on the channel communication state.

As such, when the frequency bandwidth of the channel is changed and all the channels are in use, the channel can be allocated to an additional portable terminal. For instance, the channel having the extra channel bandwidth, e.g., the partial area A of the channel 4 can be allocated to the fifth portable terminal.

The power sensor 43 detects the power level of the chaotic signal which is transmitted from the wireless headset 2 to the portable terminal 1, in the communications between the portable terminal 1 and the wireless headset 2. The power sensor 43 is interposed between a switch 7 and the reception circuit 20. The power sensor 43 can be implemented using a diode. The power sensor 43 provides the detected power level of the chaotic signal to the controller 45.

The controller 45 applies a signal for controlling the increase or the decrease of the number of the sub-channels to the filter 41 using the power level of the chaotic signal detected at the power sensor 43 and based on whether the chaotic signal is received from the wireless headset 2.

First, the controller 45 splits a threshold of the power level of the chaotic signal, which is detected at the power sensor 43, into plural thresholds according to the number of the sub-channels. By way of example, as for three sub-channels, the threshold of the power level is split to a first threshold and a second threshold, where the first threshold is greater than the second threshold. When the power level of the chaotic signal detected at the power sensor 43 is below the first threshold, the controller 45 generates a control signal to use one more sub-channel. When the power level is below the second threshold, the controller 45 generates a control signal to use two more sub-channels.

In particular, when the power sensor 43 detects that the power level is below the first threshold after the transmission and reception of the chaotic signal only in the sub-channel 1 of the channel 1, the controller 45 generates a signal which controls the filter 41 to use the sub-channel 2. When the power sensor 43 detects the power level is below the second threshold, the controller 45 generates a signal which controls the BPF 41 to use both of the sub-channel 2 and the sub-channel 3.

When the chaotic signal is not received from the wireless headset 2 within a preset time, the controller 45 applies a control signal which changes the filtered frequency band to the BPF 41 to increase the number of sub-channels in use. At this time, the number of sub-channels can be increased by one or more sub-channels.

During the communications between the portable terminal 1 and the wireless headset 2, the controller 45 continually monitors the power level of the chaotic carrier received from the wireless headset 2. When the power level falls below the first or second threshold, the controller 45 controls the BPF 41 to increase the number of the sub-channels in real time.

The wireless communication system of the portable terminal 1 further includes a switch 7 for connecting one of the transmission circuit 10 and the reception circuit 20 to the antenna 5. The BPF 41 of the channel changing circuit 40 is interposed between the antenna 5 and the switch 7. Accordingly, either the transmitted chaotic signal or the received chaotic signal is transmitted and received under the condition that the chaotic signal belongs to the sub-channel of the preset channel, that is, the preset frequency band.

A signal processing circuit 50 for processing a CDMA signal, a baseband processor 35 for packetizing data bits, and an interface 33 for controlling the operation of the switch 7 under control of the controller 45 are provided.

The transmission circuit 10 includes a chaotic signal generator 30, a modulator 11, and a power amplifier 15. The transmission circuit 10 processes and transmits voice signal, MP3, or audio data, which is processed at the signal processing circuit 50, to the wireless headset 2. In doing so, the signal processing circuit 50 provides the baseband processor 35 with the voice signal as data bits or data signal, and the baseband processor 35 packetizes the data bits or the data signal and applies it to the modulator 11.

The chaotic signal generator 30 generates a chaotic signal having a plurality of frequency components in the preset frequency band. As shown in the graph as to the point ⓓ in FIG. 3, the chaotic signal is generated with successive pulses having different cycles and amplitudes in view of the time domain. The frequency band of the chaotic signal may vary according to the design of the chaotic signal generator 30. In the wireless communication system of the present invention, the chaotic signal is generated in the frequency band of 3.1~5.1 GHz which is the ultra wideband.

The modulator 11 generates a chaotic carrier by synthesizing the chaotic signal generated at the chaotic signal generator 30 with the data signal. As shown in the graph as to the point (a), the binary data bits of 0s and 1s are provided to the modulator 11 as pulses as shown in the graph as to the point (b). When the data signal and the chaotic signal are synthesized, the chaotic carrier is generated such that the chaotic signal is present only in information areas of the data signal as shown in the graph as to the point (e). Even after the modulation, the frequency band of the chaotic carrier is the same as the frequency band of the chaotic signal.

When the transmission circuit 10 operates, the interface 33 controls the switch 7 to connect the transmission circuit 10 to the antenna 5. The chaotic carrier generated at the transmission circuit is filtered at the BPF 41 and then transmitted to the wireless headset 2 via the antenna 5.

The reception circuit 20 includes a low noise amplifier (LNA) 21, a signal detector 23, an automatic gain control (AGC) amplifier 25, a low pass filter (LPF) 27, and an analog-to-digital (A/D) converter 29. The reception circuit 20 functions to receive and process the data signal which is wirelessly input from the wireless headset 2. Herein, the data signal can be a control signal for the transmitter terminal to control the receiver terminal, besides the voice data signal or the video data signal. The data signal is not limited to a specific data signal.

The LNA 21 amplifies the chaotic carrier received via the antenna 5 and applies the amplified chaotic carrier to the signal detector 23.

The signal detector 23 extracts the data signal by detecting the envelope of the chaotic carrier. The signal detector 23 can be implemented using a diode. The chaotic carrier, which passed through the signal detector 23, is the curved waveform as shown in the graph as to the point (c).

The AGC amplifier 25, which is capable of increasing the gain, amplifies the waves extracted at the signal detector 23 to certain levels. The LPF 27 filters the amplified waves so that the A/D converter 29 can convert it to the digital signal.

As converting the curved waveform to the digital signal, the A/D converter 29 extracts the pulsed data signal.

The data signal is provided to the signal processing circuit 50 through the baseband processor 35, processed to the CDMA signal, and then transmitted to the base station.

As such, although the portable terminal 1 of FIG. 3 has both the transmission circuit 10 and the reception circuit 20 therein, a wireless earphone has only the reception circuit 20. That is, the transmission circuit 10 and/or the reception circuit 20 can be selectively equipped depending on the wireless communication device.

Figure 5:
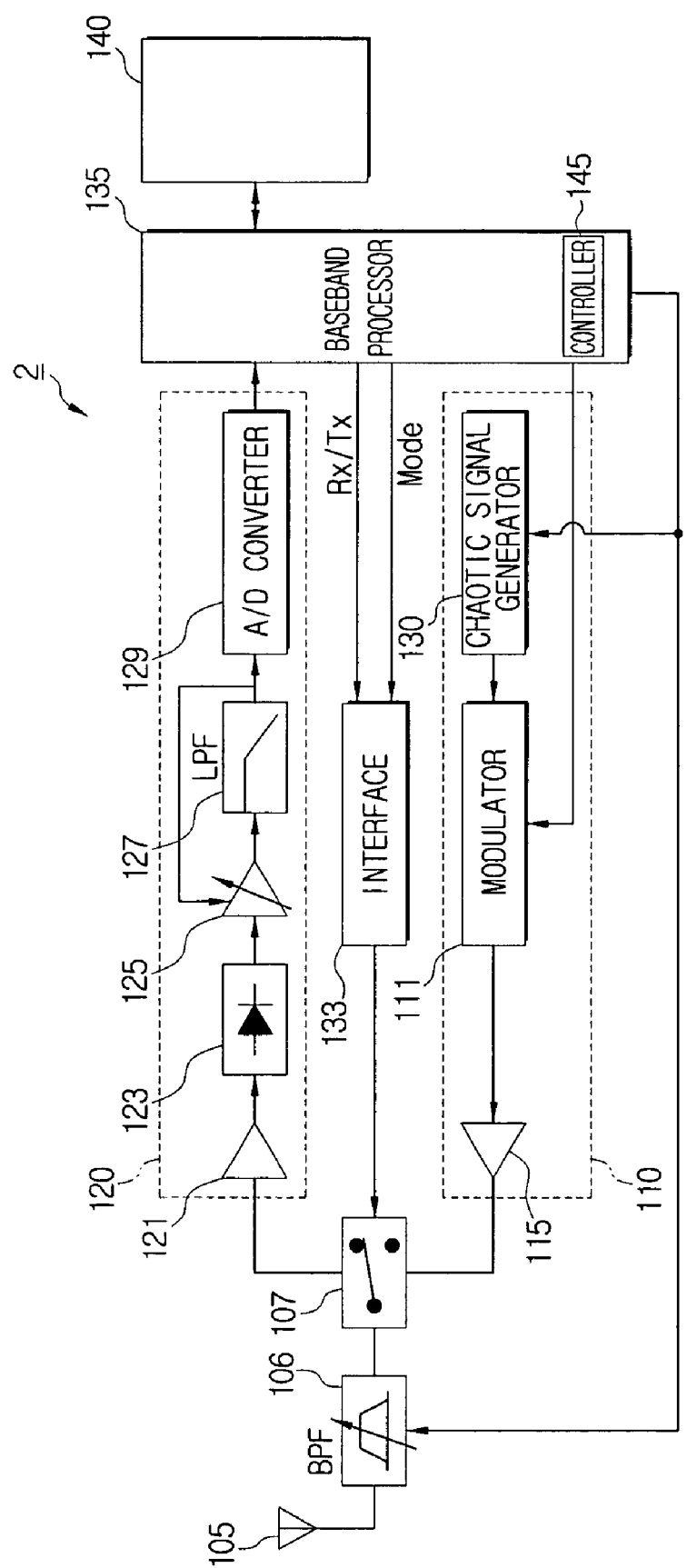
FIG. 5 is a block diagram of a wireless communication system provided in the wireless headset according to an exemplary embodiment of the present invention.

FIG. 5 is a block diagram of a wireless communication system provided in the wireless headset according to an exemplary embodiment of the present invention.

As shown in FIG. 5, the wireless communication system of the wireless headset 2 includes a reception circuit 120 and a transmission circuit 110, similar to the wireless communication system of the portable terminal 1.

The reception circuit 120 includes an LNA 121, a signal detector 123, an AGC amplifier 125, an LPF 127, and an A/D converter 129. The reception circuit 120 extracts the radio signal from the chaotic carrier received from the portable terminal 1 and outputs the extracted radio signal.

The transmission circuit 110 includes a chaotic signal generator 130, a modulator 111, and a power amplifier 115. The transmission circuit 110 synthesizes a voice signal input to the microphone with the chaotic signal and transmits the synthesized signal to the portable terminal 1.

At one end of the wireless communication system of the wireless headset 2, facing the portable terminal 1, an antenna 105, a switch 107, and a BPF 106 are provided. Herein, the BPF 106 is set to filter only the frequency band corresponding to the channel which is determined by the BPF 41 of the portable terminal 1, and the channel is changed by the signal from the controller 145. The BPF 106 is set to transmit and receive the chaotic carrier in the entire frequency bands of the preset channel in the initial operation.

When the chaotic carrier is incoming in the preset channel in the initial communication and identification (ID) of the wireless headset 2 is requested, the controller 145 transmits the ID in the corresponding frequency band of the corresponding channel. Next, when the portable terminal 1 wants the radio communications in the corresponding channel, the chaotic carrier containing data is conveyed in the corresponding channel and the controller 45 controls the BPF 41 to set the channel of the wireless headset 2 to the channel in which the chaotic carrier containing the data is conveyed.

Meanwhile, when the channel power is below a specific level in the initial communication, the portable terminal 1 re-requests the ID by increasing the sub-channels and the controller 145 receives the chaotic carrier in the corresponding sub-channel of the corresponding channel and re-transmits the signal to the portable terminal 1. This procedure is repeated until the portable terminal 1 confirms the signal reception with the sufficient power level. Hence, as changing the sub-channel, the controller 145 transmits a response signal until the chaotic carrier from the portable terminal 1 is detected and the sub-channel is set.

In case of the transmission of one-way data from the portable terminal 1 to the wireless headset 2, that is, in case of the transmission of MP3 or audio data, the controller 145 provides the portable terminal with a signal to acquire the power level of the channel at intervals during the communications between the portable terminal 1 and the wireless headset 2. This is to prepare for the change of the channel environment during the communications of the portable terminal 1 and the wireless headset 2. The portable terminal 1 can increase or decrease the number of the sub-channels according to the channel state by receiving the corresponding signal. By contrast, in case of the bidirectional data transmission between the portable terminal 1 and the wireless headset 2, that is, in case of the telephone call, there is no need to transmit an additional signal from the wireless headset 2 to the portable terminal I because the portable terminal 1 can acquire the channel state by use of the chaotic carrier received from the wireless headset 2.

At the other end of the wireless communication system, a baseband processor 135 for packetizing data bits, an interface 133 for controlling the operation of the switch 107 under control of the controller 145, and an audio interface 140 are provided.

The reception circuit 120, the transmission circuit 110, and the other components carry out the same functions as the components of the wireless communication system of the portable terminal 1. Simply, the types of the processed data signal are different. Hence, further explanation thereof will be omitted for brevity.

Figure 6A:
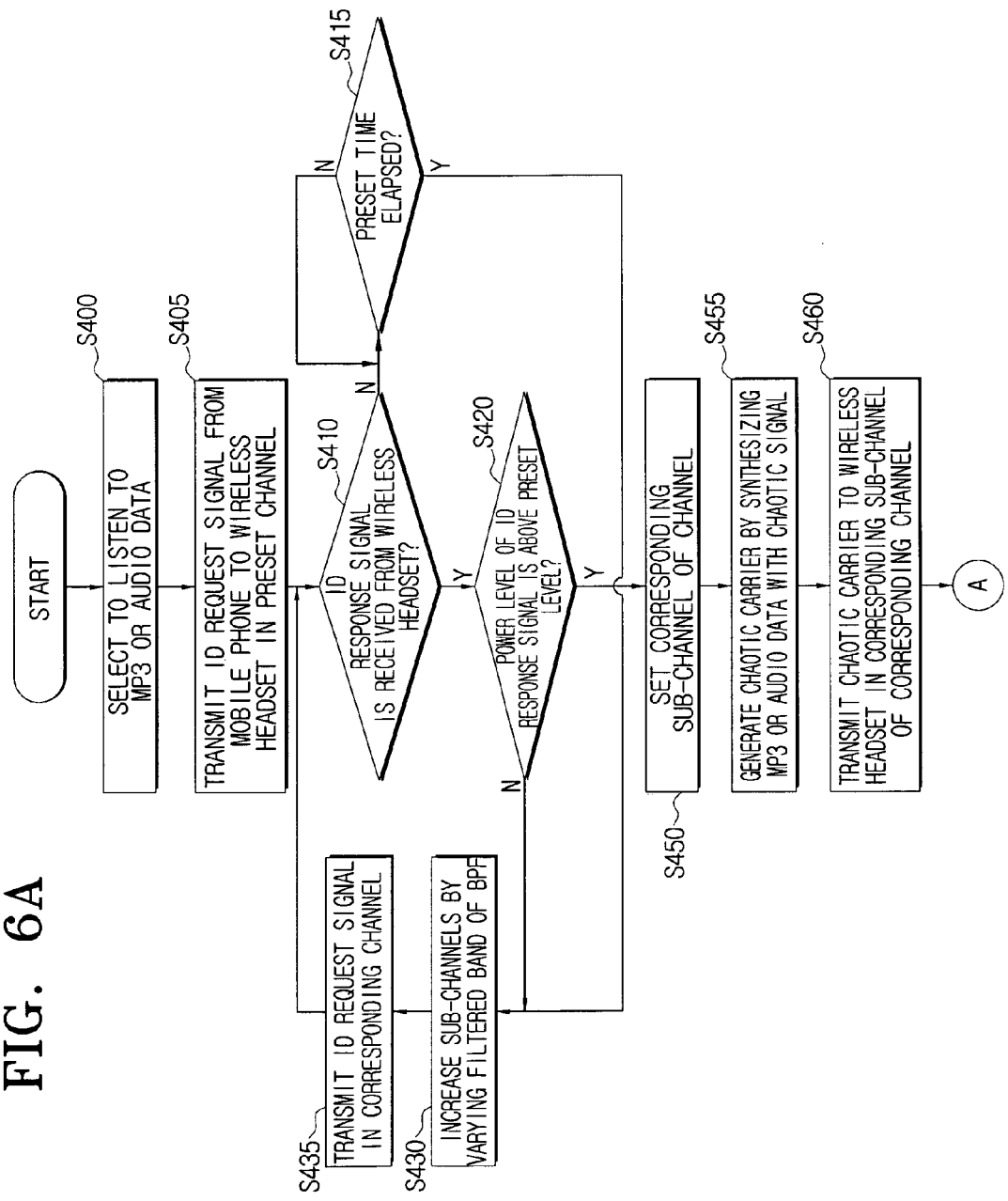
FIGS. 6A and 6B are flowcharts outlining sub-channel adjustment and channel adjustment between the portable terminal and the wireless headset having the wireless communication system, respectively.
Figure 6B:
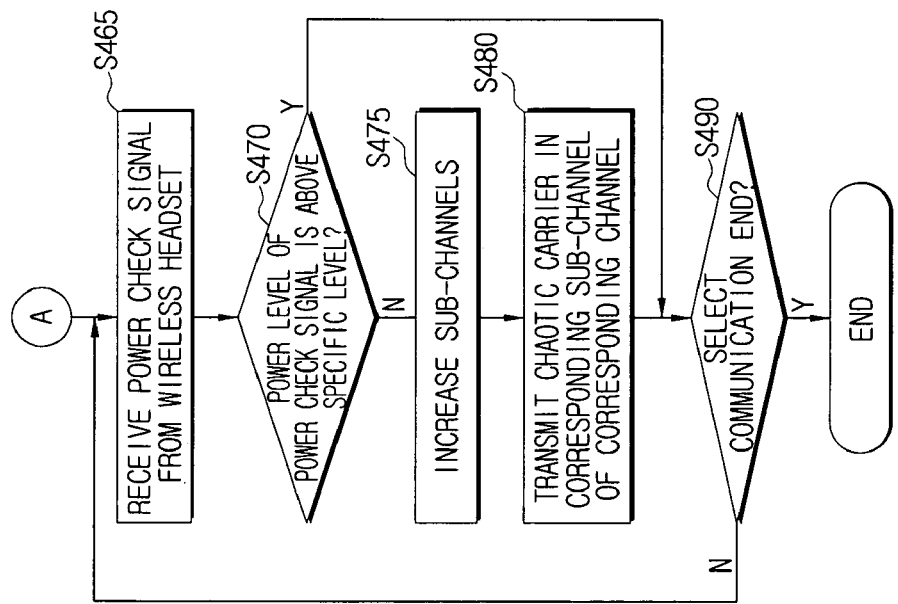

With the wireless communication systems as constructed above, the channel setting between the portable terminal 1 and the wireless headset 2 is now illustrated in reference to FIG. 6A and FIG. 6B.

When a user wants to listen to MP3 or audio data through the portable terminal 1, the user selects the output of the MP3 or audio data by manipulating buttons of the portable terminal 1 or the wireless headset 2 (S400). Accordingly, the portable terminal 1 transmits an ID request signal to the wireless headset 2 in the preset channel, for instance, in the channel 1 (S405). The wireless headset 2 determines whether a signal is received from the portable terminal 1 in the entire frequency bands of the preset channel. When the ID request signal is incoming in a certain sub-channel of the channel 1, the wireless headset 2 transmits a ID response signal to the portable terminal 1 in the corresponding sub-channel.

The controller 45 of the portable terminal I determines whether the ID response signal is received from the wireless headset 2 (S410). When the ID response signal is not received, the controller 45 determines whether a preset time elapsed (S415). After the elapse of the preset time, the controller 45 increases the number of the sub-channels by generating a signal instructing to vary the filtered band of the BPF 41 (S430). Next, the ID request signal is transmitted in the corresponding channel of the increased sub-channels (S435).

By contrast, when the ID response signal is received from the wireless headset 2, the controller 45 determines whether the power level of the ID response signal, which is detected at the power sensor 43, is above a preset level (S420). When the power level of the ID response signal is above the preset level, the sub-channel of the channel and the ID are set (S450). The controller 45 operates the chaotic generator 30 and the modulator 11 to generate the chaotic carrier by synthesizing the MP3 or audio data with the chaotic signal (S455). Next, the chaotic carrier is transmitted to the wireless headset 2 in the sub-channel of the corresponding channel (S460).

By contrast, when the power level of the ID response signal does not exceed the preset level, the controller 45 increases the umber of the sub-channels by repeating the operations S410 through S435 and re-transmits the ID request signal in the increased sub-channel.

The operations S410 through S435 are repeated until the power level of the ID response signal exceeds the preset level.

Meanwhile, when the channel is set and the chaotic carrier containing the inserted data is received from the portable terminal 1, the wireless headset 2 transmits a power check signal to inform the channel state of the wireless headset 2 at intervals.

Upon receiving the power check signal from the wireless headset 2 at operation (S465), the controller 45, of the portable terminal 1, determines whether the power level of the power check signal is above a preset level (S470). When the power level does not exceed the preset level, the controller 45 increases the number of the sub-channels by applying a signal to vary the filtered band of the BPF 41 (S475). The chaotic carrier is transmitted in the corresponding channel of the increased sub-channels (S480).

In case that the user selects the communication end (S490), the communications are terminated. Otherwise, the operations S465 through (S490) are repeated so as to cope with the change of the channel environment in real time.

As for the telephone call between the portable terminal 1 and the wireless headset 2, the portable terminal 1 can determine the power level of the sub-channel used in the corresponding channel by use of the chaotic carrier which is received with the voice from the wireless headset 2. Thus, the wireless headset 2 does not need to separately transmit the power check signal to the portable terminal 1 for the telephone call.

As such, in the wireless communication system, the chaotic signal, is divided to the plurality of channels and sub-channels, and transmitted and received using a partial sub-channel of the pre-selected channel. Accordingly, the entire channel may not be used in the broadband frequency band. In this case, the power consumption can be drastically reduced during the transmission and reception of the chaotic carrier. In addition, since the number of the sub-channels can be increased or decreased in real time according to the channel state, the high-quality communications are feasible between the portable terminal 1 and the wireless headset 2 in the optimized channel environment.

Even when all channels in a certain communication range are in use, an available sub-channel is temporarily allocated to an additional portable terminal which enters the wireless communication range. Thus, a greater number of portable terminals and wireless headset can execute the radio communications within a certain wireless communication range.

The channel change can be carried out promptly and efficiently in the simply way by detecting the power level at the power sensor 43 of the filter 41.

In light of the foregoing, since the chaotic carrier is transmitted and received in the narrow frequency band by adjusting the frequency bandwidth, the power consumption can be drastically reduced and the high-quality communications are feasible between the portable terminal and the wireless headset in the optimized channel environment. Furthermore, a greater number of portable terminals and wireless headsets can execute the radio communications in a certain wireless communication range.

While the present invention has been particularly shown and described with reference to exemplary embodiments thereof, it will be understood by those skilled in the art that various changes in form and details may be made therein without departing from the spirit and scope of the invention as defined by the appended claims.

What is claimed is:

1. A wireless communication terminal which divides at least one channel of a plurality of channels of a frequency band for ultra-wideband communications into at least one sub-channel of a frequency bandwidth smaller than a frequency bandwidth of the at least one channel, the wireless communication terminal comprising:
    a transmission circuit and a reception circuit which respectively transmit and receive a chaotic signal having a plurality of frequency components through the plurality of channels, and
    a channel changing circuit which adjusts the frequency bandwidth of the at least one channel to create the at least one sub-channel when a certain condition is satisfied,
    wherein, when the certain condition is satisfied, at least one frequency component of the plurality of frequency components of the chaotic signal is transmitted and received through the at least one sub-channel.

2. The wireless communication terminal of claim 1, wherein the certain condition is determined according to a power level of the chaotic signal.

3. The wireless communication terminal of claim 1, wherein the channel changing circuit comprises a power sensor which detects a power level of the chaotic signal.

4. The wireless communication terminal of claim 1, wherein the channel changing circuit comprises:
    a filter which changes a frequency bandwidth by adjusting a filtered band of the chaotic signal.

5. The wireless communication terminal of claim 4, wherein the filter is a band pass filter.

6. The wireless communication terminal of claim 4, further comprising:
    a controller which generates a control signal to vary a filtered band of the filter according to a power level of the chaotic signal.

7. The wireless communication terminal of claim 6, wherein the controller linearly increases or decreases the frequency bandwidth according to the power level of the chaotic signal.

8. The wireless communication terminal of claim 6, wherein the controller increases the frequency bandwidth if the power level of the received chaotic signal is low.

9. The wireless communication terminal of claim 1, wherein a controller determines whether to use the sub-channels of a selected channel according to a power level of the received chaotic signal.

10. The wireless communication terminal of claim 9, wherein the controller increases a number of the sub-channels in the selected channel if the power level of the received chaotic signal is lower than a threshold.

11. The wireless communication terminal of claim 9, wherein a controller generates a control signal to increase a number of the sub-channels in use if the chaotic signal is not received within a preset time.

12. The wireless communication terminal of claim 1, wherein a guard band of a certain width is formed between neighboring channels, and the chaotic signal is not transmitted and received in the guard band.

13. The wireless communication terminal of claim 1, wherein, if all of the channels within a certain wireless communication range are in use, an available sub-channel of the at least one sub-channel is temporarily allocated to a wireless communication terminal which enters the certain wireless communication range.

14. The wireless communication terminal of claim 1, wherein the wireless communication terminal is one of a portable terminal, a computer, an MPEG-1 Audio Layer 3 player, a radio frequency transceiver, a television, an audio, a personal music player, a personal data assistant, a wireless headset, a wireless mouse, and a computer peripheral.

15. The wireless communication terminal of claim 1, wherein the chaotic signal is received from one of a portable terminal, a computer, an MPEG-1 Audio Layer 3, a radio frequency transceiver, a television, a personal music player, a personal data assistant, a wireless headset, a wireless mouse, a computer peripheral, and a speaker.

16. A channel bandwidth adjusting method of a wireless communication terminal, the method comprising:
    generating a plurality of channels by dividing at least part of a frequency band for ultra-wideband communications to a plurality of frequency bands, and transmitting a chaotic signal having a plurality of frequency components in a channel of the plurality of channels;
    determining communication state of the channel by detecting energy of the chaotic signal;
    determining whether to change a frequency bandwidth in the channel according to the channel communication state; and
    transmitting and receiving the chaotic signal in a certain frequency band of the channel.

17. The channel bandwidth adjusting method of claim 16, wherein the transmitting of the chaotic signal comprises:
    generating a plurality of sub-channels by dividing each of the plurality of channels into a plurality of frequency bands.

18. The channel bandwidth adjusting method of claim 17, wherein the transmitting of the chaotic signal comprises:
    transmitting the chaotic signal through at least one sub-channel of the plurality of sub-channels.

19. The channel bandwidth adjusting method of claim 17, wherein the determining whether to change the frequency bandwidth of the channel changes a number of the sub-channels in a selected channel according to a power level of the chaotic signal.

20. The channel bandwidth adjusting method of claim 17, wherein the determining whether to change the frequency bandwidth increases the number of the sub-channels in the selected channel if the chaotic signal is not received within a preset time.

21. The channel bandwidth adjusting method of claim 17, wherein the determining whether to change the frequency bandwidth increases the number of the sub-channels if a power level of the chaotic signal received from a receiver terminal is below a specific level.

22. The channel bandwidth adjusting method of claim 17, further comprising:
    temporarily allocating an available sub-channel of the channels to a wireless communication terminal which enters a certain wireless communication range if all the channels within the certain wireless communication range are in use.

23. The channel bandwidth adjusting method of claim 16, wherein the channel communication state is determined by detecting a power level of the received chaotic signal.

24. The channel bandwidth adjusting method of claim 16, wherein the determining whether to change the frequency bandwidth comprises:

linearly increasing or decreasing the frequency bandwidth according to a power level of the received chaotic signal.

25. The channel bandwidth adjusting method of claim 16, wherein the determining whether to change the frequency bandwidth comprises:

increasing the frequency bandwidth when the power level of the received chaotic signal is lower than a threshold.

26. The channel bandwidth adjusting method of claim 16, wherein the determining whether to change the frequency bandwidth comprises:

adjusting the passband bandwidth of a bandpass filter or controlling a signal bandwidth of the chaotic signal generated by a chaotic generator.

27. The channel bandwidth adjusting method of claim 26, wherein the filter is a band pass filter.

* * * * *